(12) United States Patent
Fukuhara

(10) Patent No.: US 6,587,796 B2
(45) Date of Patent: Jul. 1, 2003

(54) ULTRASONIC FLOWMETER

(75) Inventor: Satoshi Fukuhara, Tokyo (JP)

(73) Assignee: Yokogawa Electric Corporation, Tokyo (JP)

(*) Notice: Subject to any disclaimer, the term of this patent is extended or adjusted under 35 U.S.C. 154(b) by 0 days.

(21) Appl. No.: 10/074,837

(22) Filed: Feb. 13, 2002

(65) Prior Publication Data

US 2002/0143479 A1 Oct. 3, 2002

(30) Foreign Application Priority Data

Feb. 15, 2001 (JP) .......................................... 2001-038255

(51) Int. Cl.[7] .............................. G06F 19/00; G01P 5/22

(52) U.S. Cl. ...................... 702/45; 702/49; 73/861.25; 73/861.29

(58) Field of Search ....................... 73/861.25, 861.29, 73/861.18, 861.05; 702/45, 80, 49, 179

(56) References Cited

U.S. PATENT DOCUMENTS 4,528,857 A * 7/1985 Bruner .................... 73/861.18
5,513,535 A * 5/1996 Mayranen et al. ....... 73/861.29

FOREIGN PATENT DOCUMENTS

JP 10091705 * 4/1998
JP 2000179734 * 6/2000

* cited by examiner

*Primary Examiner*—Kamini Shah
(74) *Attorney, Agent, or Firm*—Moonray Kojima (57) ABSTRACT

An ultrasonic flowmeter, wherein upstream and downstream receive signals are A/D-converted and thereby the discrete values thereof are determined; a cross-correlation between the upstream and downstream receive signals is determined; the result of calculation by correlation processing means is Hilbert-transformed; a phase relationship is determined by phase calculating means from the results of calculation by the correlation processing means and calculation by Hilbert transform; and a time difference in calculated from the phase calculation result provided by the phase calculating means through maximum value decision means.

4 Claims, 11 Drawing Sheets

ULTRASONIC FLOWMETER

BACKGROUND OF THE INVENTION

1. Field of the Invention

The present invention relates to an ultrasonic flowmeter for A/D-converting an ultrasonic signal, calculating a discrete correlation factor and determining a time difference equivalent to a flow velocity.

2. Description of the Prior Art

Figure 1:
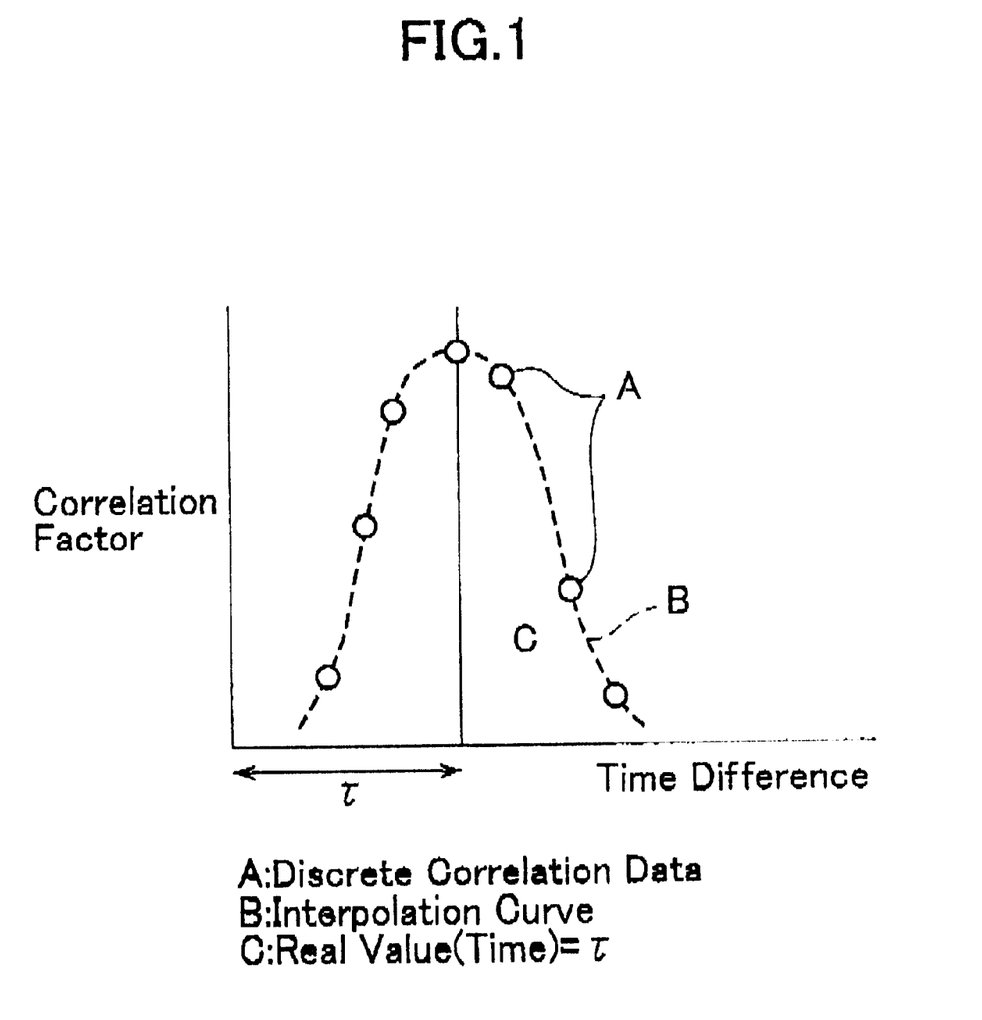
FIG. 1 in a conventional graph used to determine a precise time difference equivalent to a flow velocity.

The method of determining a flow velocity, i.e., a time difference, using a prior art ultrasonic flowmeter, according to a correlation factor between ultrasonic signals passing through a fluid has the advantage of being resistant to disturbance, such an noise. In order to determine the correlation factor between ultrasonic signals, the signals must be A/D-converted and then correlated. The correlation factor, therefore, results in a discrete value. Thus, in order to evaluate a precise time difference equivalent to a flow velocity from the resulting discrete values, the discrete data must be interpolated as shown in FIG. 1. Then, the time at which the correlation factor is at a maximum must be calculated from the interpolated discrete data.

In order to evaluate the maximum value of a correlation factor, it is common to use higher-order curvilinear interpolation. This approach requires a large amount of data, however. To be able to acquire a large amount of data, it is necessary to use extremely fast, high-resolution A/D converters and make complex higher-order curvilinear interpolation calculations. Conversely, curvilinear interpolation using a small amount of data will result in a larger calculation error. Such high-speed high-resolution A/D converters are extremely costly. In addition, higher-order curvilinear interpolation calculations tend to become complex.

SUMMARY OF THE INVENTION

The present invention has been made in the light of the above-noted problems. An object of the invention is, therefore, to provide an ultrasonic flowmeter that implements the method of calculating a time difference with improved accuracy and at higher speeds using relatively simple signal processing means and thereby determining the maximum value of a correlation factor.

In order to attain the above-noted object, the ultrasonic flowmeter in a first aspect of the present invention recited in claim 1 is defined as one for determining a flow rate according to ultrasonic signals passing through a fluid, comprising;

calculating means for A/D-converting and thereby discretizing an upstream receive signal and a downstream receive signal;

correlation processing means for determining a cross-correlation between the upstream receive signal and downstream receive signal;

calculating means for Hilbert-transforming the result of calculation made by the correlation processing means;

phase calculating means for determining a phase relationship from the results of calculation provided by the correlation processing means and Hilbert transform means; and first calculating means for calculating a time difference according to the result of phase relationship calculation made by the phase calculating means.

Therefore, according to the first aspect of the present invention recited in claim 1, upstream and downstream receive signals are discretized without having to make complex higher-order curvilinear interpolation calculations; a correlation factor is determined using correlation processing means; the result of Hilbert calculation provided by Hilbert transform means in obtained; and the maximum value of the correlation factor is determined by making a phase calculation from the correlation factor and the result of the Hilbert calculation.

In a second aspect of the present invention as recited in claim 2, the ultrasonic flowmeter of the present invention is defined an one for determining a flow rate according to ultrasonic signals passing through a fluid, comprising:

calculating means for A/D-converting and thereby discretizing an upstream receive signal and a downstream receive signal;

correlation processing means for determining a cross-correlation between the upstream receive signal and the downstream receive signal;

calculating means for Hilbert-transforming the result of calculation made by the correlation processing means;

phase calculating means for determining a phase relationship from the result of calculation made by the correlation processing means and the result of calculation provided by the Hilbert transform means;

first calculating means for determining a time difference from the result of phase relationship calculation made by the phase calculating means;

calculating means for Hilbert-transforming the upstream receive signal and the downstream receive signal;

calculating means for determining an envelope from the upstream receive signal, the downstream receive signal, and the result of calculation provided by the Hilbert transform means;

second calculating means for determining a time difference from the envelope; and a function for determining a flow velocity dependent time difference from the time difference determined by the second calculating means and the time difference determined by the first calculating means.

Therefore, according to the second aspect of the present invention recited in claim 2, upstream and downstream receive signals are Hilbert-transformed; an envelope is determined from the result of Hilbert transform based calculation of the upstream and downstream receive signals; an approximate time difference is calculated from the envelope; an accurate time difference, which is the maximum value of the approximate time difference, in then determined from the result of phase calculation; thus making it possible to identify a true time difference when the correlation factor proves to be multiple-peaked.

In a third aspect of the present invention as recited in claim 3, the ultrasonic flowmeter of the present invention is defined as one for determining a flow rate according to ultrasonic signals passing through a fluid, comprising:

calculating means for A/D-converting and thereby discretizing an upstream receive signal and a downstream receive signal;

correlation processing means for determining a cross-correlation between the upstream receive signal and the downstream receive signal;

calculating means for Hilbert-transforming the result of calculation made by the correlation processing means;

phase calculating means for determining a phase relationship from the results of calculation provided by the correlation processing means and Hilbert transform means;

first calculating means for determining a time difference according to the result of phase relationship calculation made by the phase calculating means;

third calculating means for determining an envelope from the geometric mean of the results of calculation provided by the correlation processing means and Hilbert transform means, and then calculating a time difference from the maximum value of the envelope; and a function for determining a flow velocity dependent time difference from the time difference determined by the third calculating means and the time difference determined by the first calculating means.

Therefore, according to the third aspect of the present Invention recited in claim 3, an envelope is determined from the geometric mean of a correlation factor obtained by the correlation processing means from the correlation between upstream and downstream receive signals and the result of calculation provided by Hilbert transform means; an approximate time difference is calculated from the maximum value of the envelope; an accurate time difference, which is the maximum value of the approximate time difference, is then determined from the result of phase calculation; thus making it possible to identify the true time difference when the correlation factor proves to be multiple-peaked.

In a fourth aspect of the present invention as recited in claim 4 the ultrasonic flowmeter of the present invention is defined as one for determining a flow rate according to ultrasonic signals passing through a fluid, comprising:

calculating means for A/D-converting and thereby discretizing an upstream receive signal and a downstream receive signal;

correlation processing means for determining a cross-correlation between the upstream receive signal and the downstream receive signal;

calculating means for Hilbert-transforming the result of calculation made by the correlation processing means;

phase calculating means for determining a phase relationship from the results of calculation provided by the correlation processing means and Hilbert transform means;

first calculating means for determining a time difference from the result of phase relationship calculation made by the phase calculating means;

fourth calculating means for determining the auto-correlations between upstream transmit and receive signals and between downstream transmit and receive signals respectively and thereby calculating a time difference; and a function for determining a flow velocity dependent time difference according to the time difference determined by the fourth calculating means and the time difference determined by the first calculating means.

Therefore, according to the fourth aspect of the present invention recited in claim 4, the auto-correlations between upstream transmit and receive signals and between downstream transmit and receive signals are determined respectively; an approximate time difference is calculated from the auto-correlations; and the accurate time difference, which is the maximum value of the approximate time difference, is then determined from the result of phase calculation; thus making it possible to identify the true time difference when the correlation factor proves to be multi-peaked.

BRIEF DESCRIPTION OF THE DRAWINGS

FIG. 4 is a waveform chart obtained by graphing the results of calculating the receive signals shown in FIG. 3 in each processing step, wherein: FIG. 4b is a close-up of the waveform chart shown in FIG. 4a.

FIG. 5 is a graphical waveform chart showing the result of correlation processing, wherein.

DETAILED DESCRIPTION OF THE PREFERRED EMBODIMENTS

Figure 2:
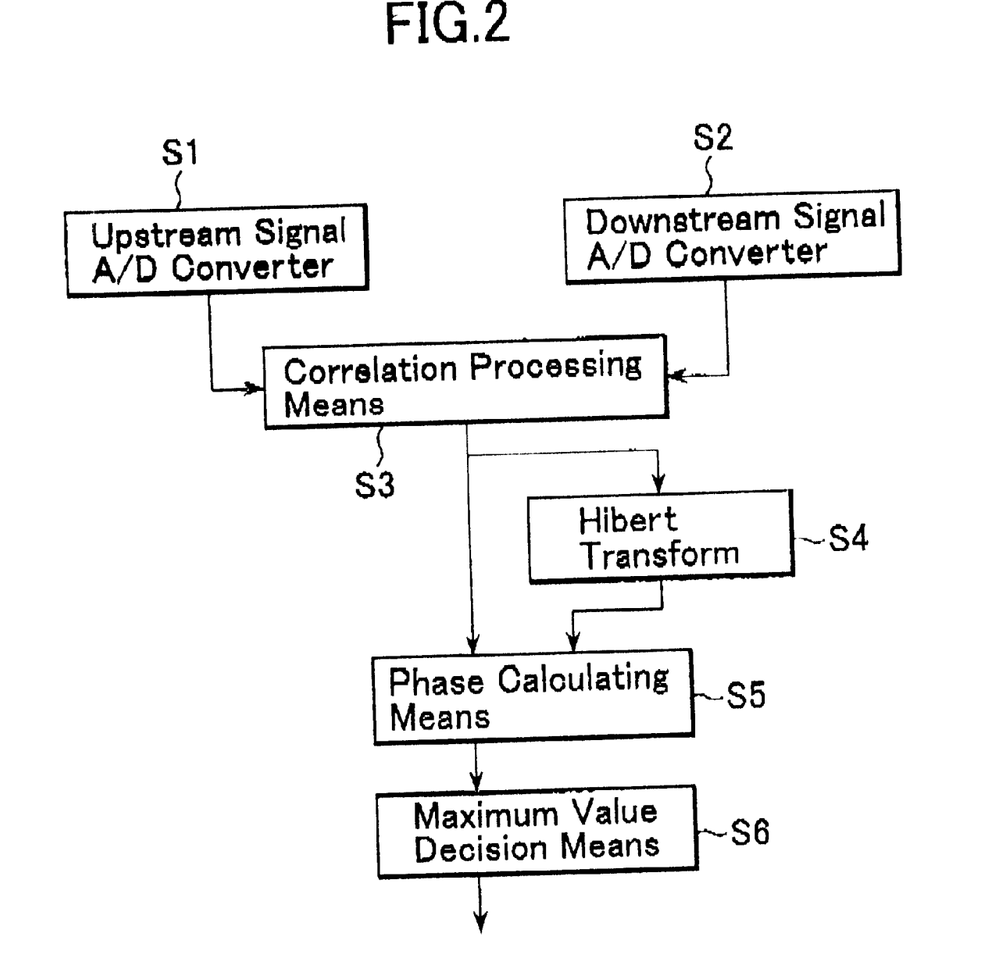
FIG. 2 is a flow chart representing a basic system for processing ultrasonic signals according to the present invention.

Modes for carrying out the present invention are described hereafter with reference to the accompanying drawings. FIG. 2 schematically shows the basic configuration of an ultrasonic flowmeter with regard to the processing of ultrasonic signals. In the figure, ultrasonic receive signals (one each on the upstream and downstream sides) passing through a fluid are changed into discrete values with A/D converters (steps S1 and S2). From the result of conversion, a cross-correlation between the upstream receive signal (ultrasonic signal propagating from the upstream side to the downstream side) and downstream receive signal (ultrasonic signal propagating from the downstream side to the upstream aide) is determined by correlation processing means (step S3).

Here, the value evaluated by the correlation processing means in assumed to be $C(\tau)$ ($\tau$ is a value equivalent to a time difference).

Also evaluated is $H(\tau)$ which is the result of Hilbert transform calculation provided by Hilbert transform means (Step 4). Then, a phase is calculated by phase calculating means using $C(\tau)$ and $H(\tau)$ (step 5). From the result of phase calculation, the maximum value of a correlation factor (time difference) is determined by maximum value decision means—first calculating means (step S6).

Figure 3:
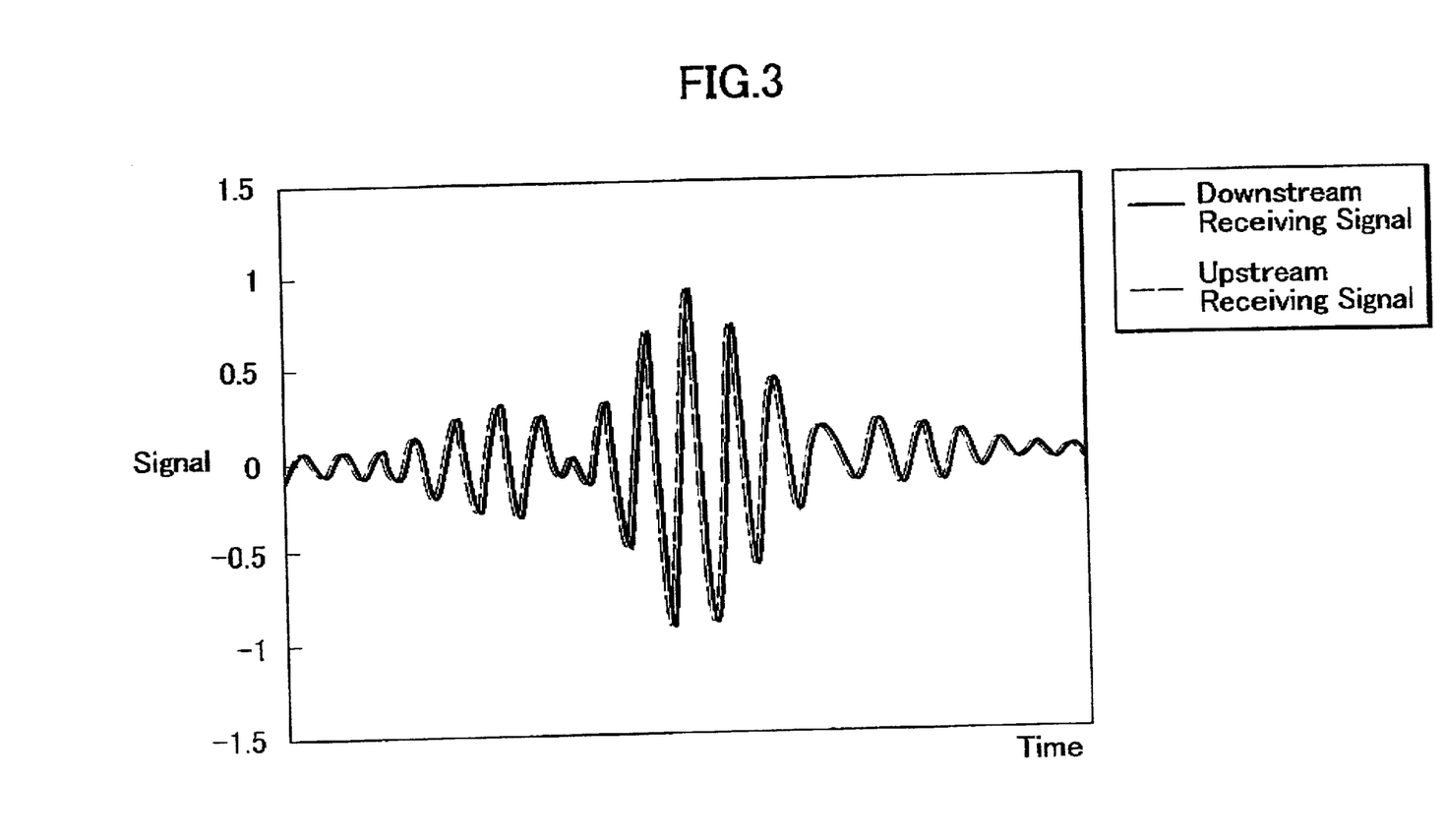
FIG. 3 is a waveform chart showing the result of A/D-converting and then the graphing of an ultrasonic receive signal.

As a rule, a receive signal transmitted through a fluid and detected in an ultrasonic flowmeter has such a waveform as shown in FIG. 3. The waveform of FIG. 3 has been obtained by graphing the result of A/D converting a receive signal detected after actually transmitting a burst wave through the wall of an SUS stainless-steel pipe into a fluid. In this graphical waveform chart, the receive signal is normalized with regard to strength and the horizontal axis represents time.

The fundamental frequency of the waveform (carrier frequency) equals the resonant frequency of a transmitting device, for example, a piezoelectric device serving as a transmitter. Any waveform obtained at this point can be regarded an a sine wave. In addition, the shape of an enveloped wave depends on the resonance of a measuring system as a whole, for example, resonance due to multiple reflection within the thickness of a pipe wall. For burst waves, the shape depends on the time interval of the waves, noise that may occur in the measuring system, and so on.

Now, the result of correlation factor (correlation function) calculation made by the correlation processing means shown in FIG. 2 is approximated to know what waveform the correlation function will provide. As shown in FIG. 3, the receive signal can be assumed to be a sine wave with a frequency dependent on the transmitting device. Also let's assume that the transmission frequency f0, the time difference between the upstream and downstream receive signals is δ, and the random variable uniformly distributed within the interval $[0\ 2\pi]$ is θ.

Then, it is possible to represent the upstream and downstream receive signals by equation 1, with reference to the time of the downstream receive signal.

Upstream: $\sin(2\pi f0t+\delta)$, Downstream: $\sin(2\pi f0t)$  Equation 1

The cross-correlation function $C(\tau)$ is represented by equation 2 below.

$$C(\tau) = \int_0^{2\pi} \frac{1}{2\pi} \cdot [[\sin(2\pi fot + \theta + \delta) \cdot \sin[2\pi fo(t+\tau)] + \theta]]d\theta$$
$$= \frac{1}{2} \cdot \cos(\delta - 2\pi fo\tau)$$

Equation 2

As is evident from equation 2, the cross-correlation function of a sine wave having frequency f0 has the same frequency as f0.

Now, as the result of Hilbert-transforming the cross-correlation function $C(\tau)$, equation 4 is derived from equation 2, instead of equation 3 also derived therefrom.

$\cos(\delta-2\pi f0\tau)$  Equation 3

$H(\tau)=\sin\{-(\delta-2\pi f0\tau)\}$  Equation 4

Now, regarding the phase calculating means, it is possible to define a phase relationship $P(\tau)$ between $C(\tau)$ and $H(\tau)$ by equation 5.

$P(\tau)=\tan^{-1}(H(\tau)/C(\tau))$  Equation 5

Consequently, equation 6 holds true.

$C(\tau)/H(\tau)=\sin\{-(\delta-2\pi f0\tau)\}/\cos(\delta-2\pi f0\tau)=-\tan(\delta-2\pi f0\tau)$  Equation 6

Hence, equation 7 can be obtained.

$P(\tau)=2\pi f0\tau-\delta$  Equation 7

Thus, the zero-cross point of the phase $P(\tau)$ is equivalent to the maximum value of the correlation function, which is equal to the time difference and to the flow velocity as well. In practice, δ is determined from discrete time data. Since the phase relationship equation is linear with respect to time τ, it is theoretically possible to precisely determine the time difference by means of linear approximation. This in still true even if actual data carries fluctuations due to, for example, noise.

Figure 4A:
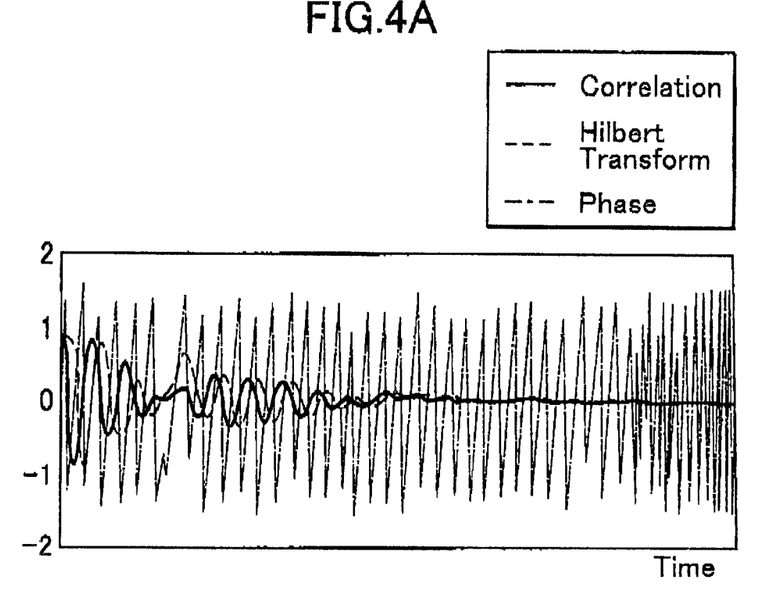
FIG. 4a is a waveform chart showing the result of calculating a cross-correlation between the receive signals of FIG. 3, the Hilbert transform of the calculation result, and a phase relationship thus determined.
Figure 4B:
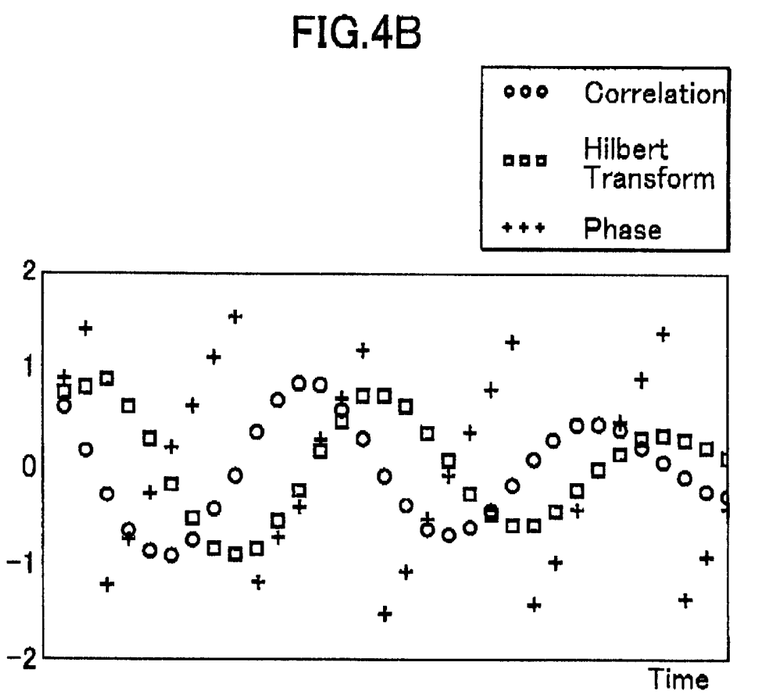

In FIG. 4, the result of processing respective ultrasonic receive signals is graphed. A dotted line in FIG. 4a shows the result of calculating the cross-correlation function $C(\tau)$, a chain line shows the Hilbert transform $H(\tau)$ of the cross-correlation function, and a chain double-dashed line shows the phase relationship between the two functions. Thus, it is evident from either FIG. 4a or FIG. 4b, which is a close-up of FIG. 4a, that δ can be easily determined from discrete data by means of linear approximation.

This result of signal processing recurs at an interval of 0 to $2\pi$ and the result of phase calculation provides a recurrent solution. To allow the largest value to be determined, comparison among obtained maximum values must be made or different means for predicting the maximum value discussed later must be used concurrently.

Figure 12:
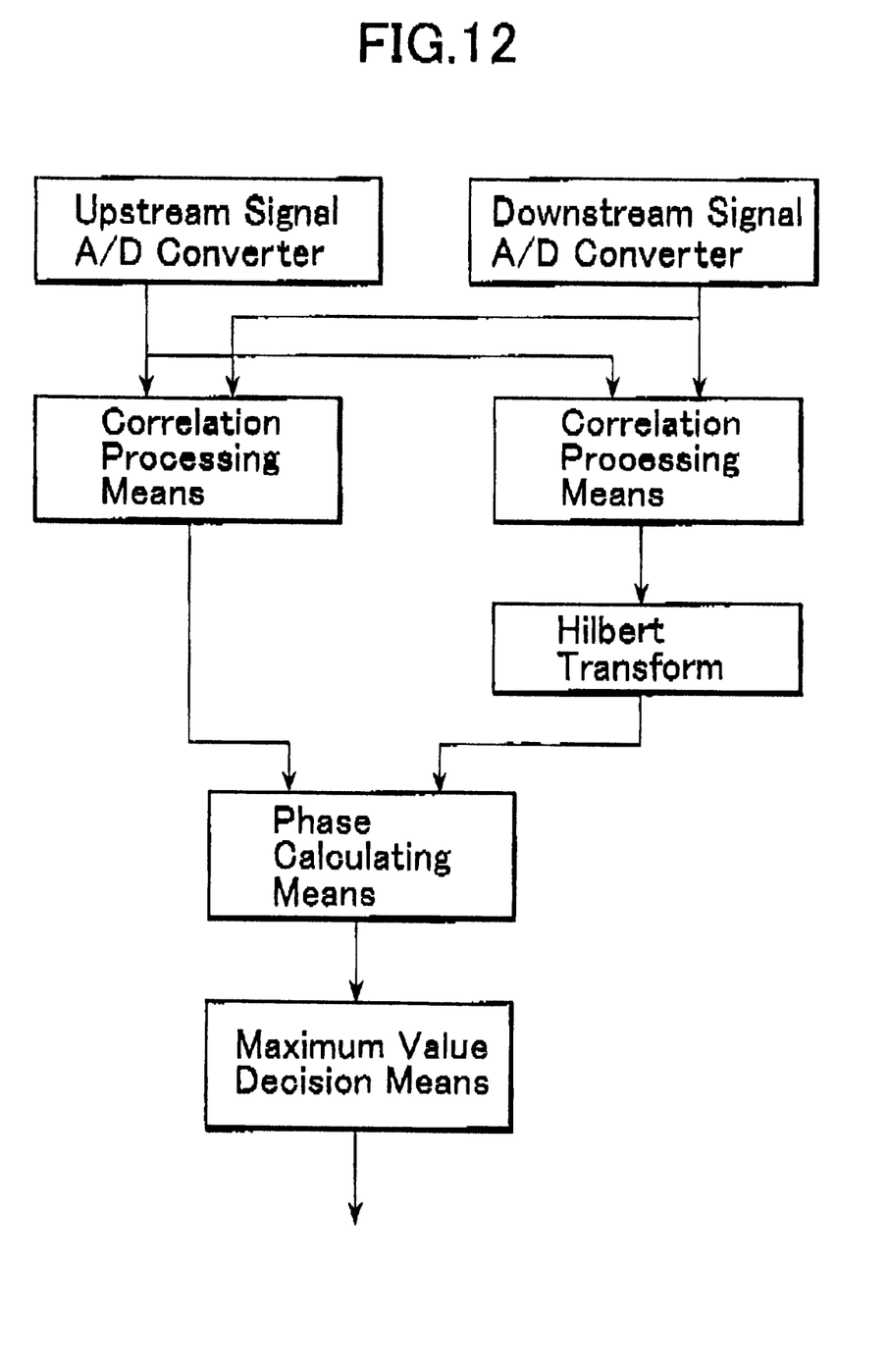
FIG. 12 in a flow chart representing a case where a plurality of correlation processing means are used in the system of FIG. 2.

Referring back to FIG. 2, it is possible to incorporate plurality into the correlation processing means. It is also possible to include plural units serving as correlation processing means dedicated to Hilbert transform, as shown in FIG. 12, thereby increasing the overall processing speed.

Figure 5A:
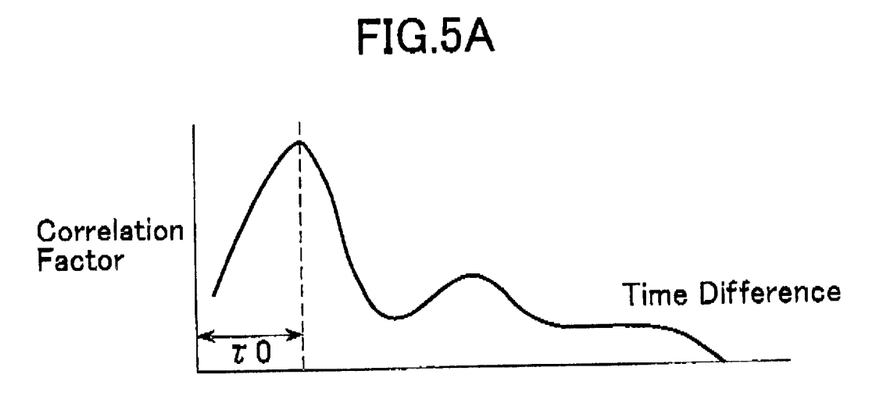
FIG. 5a is a graphical waveform chart showing a regular result of correlation processing.
Figure 5B:
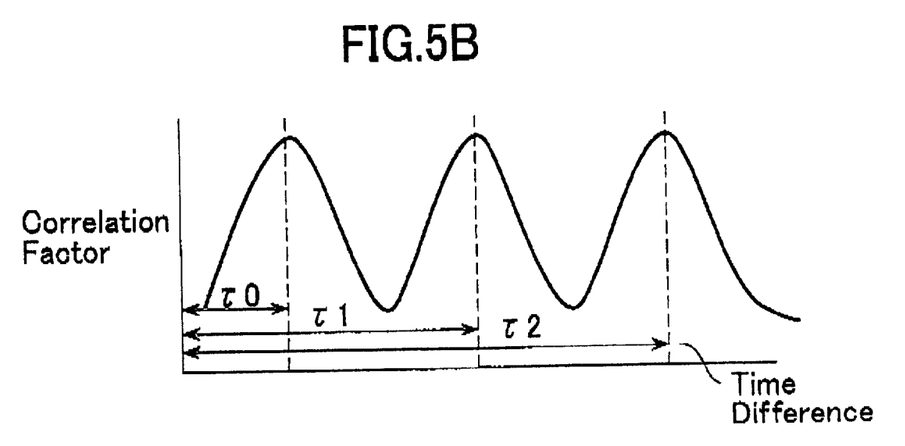
FIG. 5b is a graphical waveform chart showing a multiple-peaked result of correlation processing.

Another mode for carrying out the present invention will be described now, wherein additional steps are included in the basic flowmeter configuration to cope with a case where a correlation factor obtained an the result of correlation processing is multiple-peaked. In the case of a clamp-on ultrasonic flowmeter in particular, the correlation factor may become multiple-peaked for such a reason that an ultrasonic wave causes multiple reflection due to thin-walled piping. FIG. 5a shows a regular result of correlation processing, whereas FIG. 5b illustrates a multiple-peaked result. If the heights of peaks are analogous to each other, an shown in FIG. 5b, it is difficult to determine which is the true peak, i.e., the true time difference.

Figure 6:
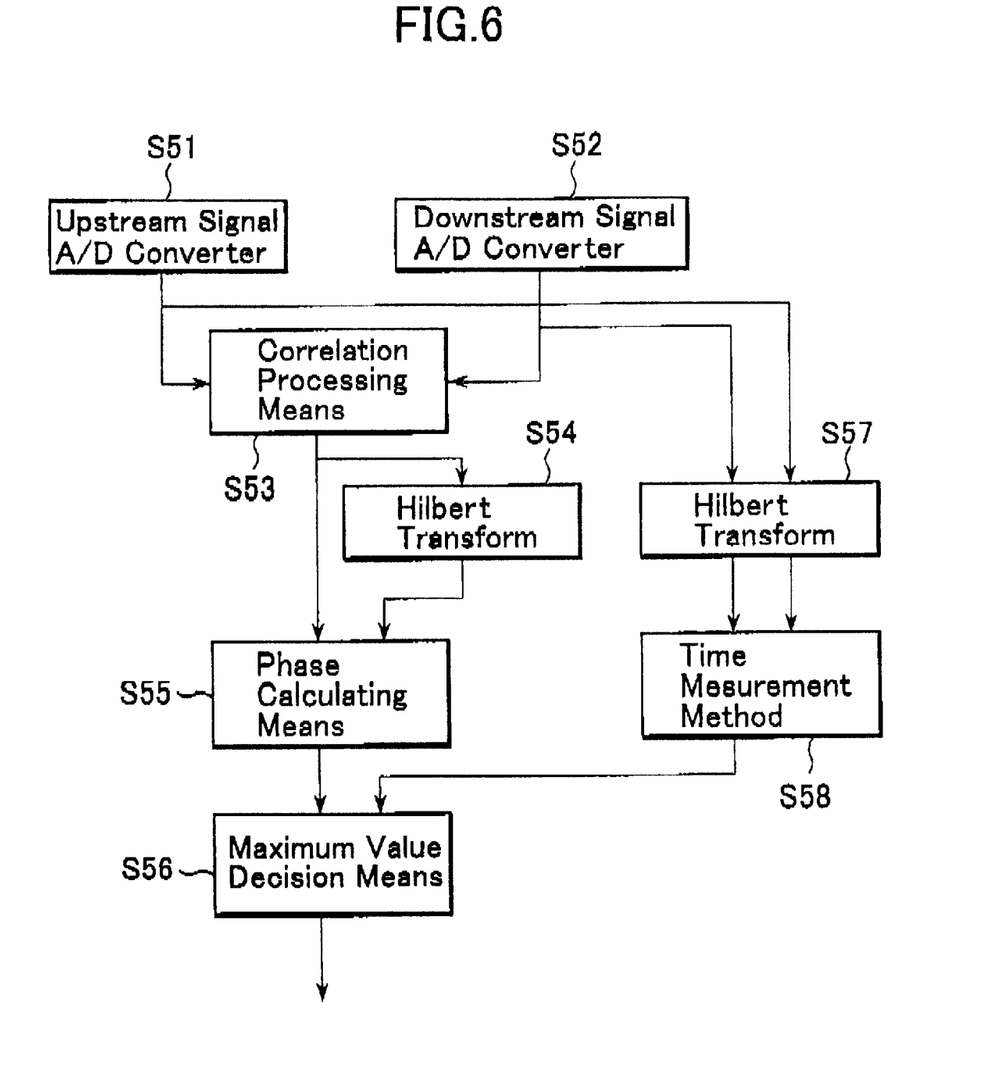
FIG. 6 is a flow chart representing a basic system for processing ultrasonic signals according to the present invention, wherein a correlation factor which is the result of correlation processing prove to be multiple-peaked.

Accordingly, processing based on the flowmeter configuration shown in FIG. 6 is applied to multiple-peaked signals. Added to the flowmeter configuration of FIG. 2 is means for identifying an approximate time in order to determine what degree of time difference is most plausible in a given case.

Figure 7:
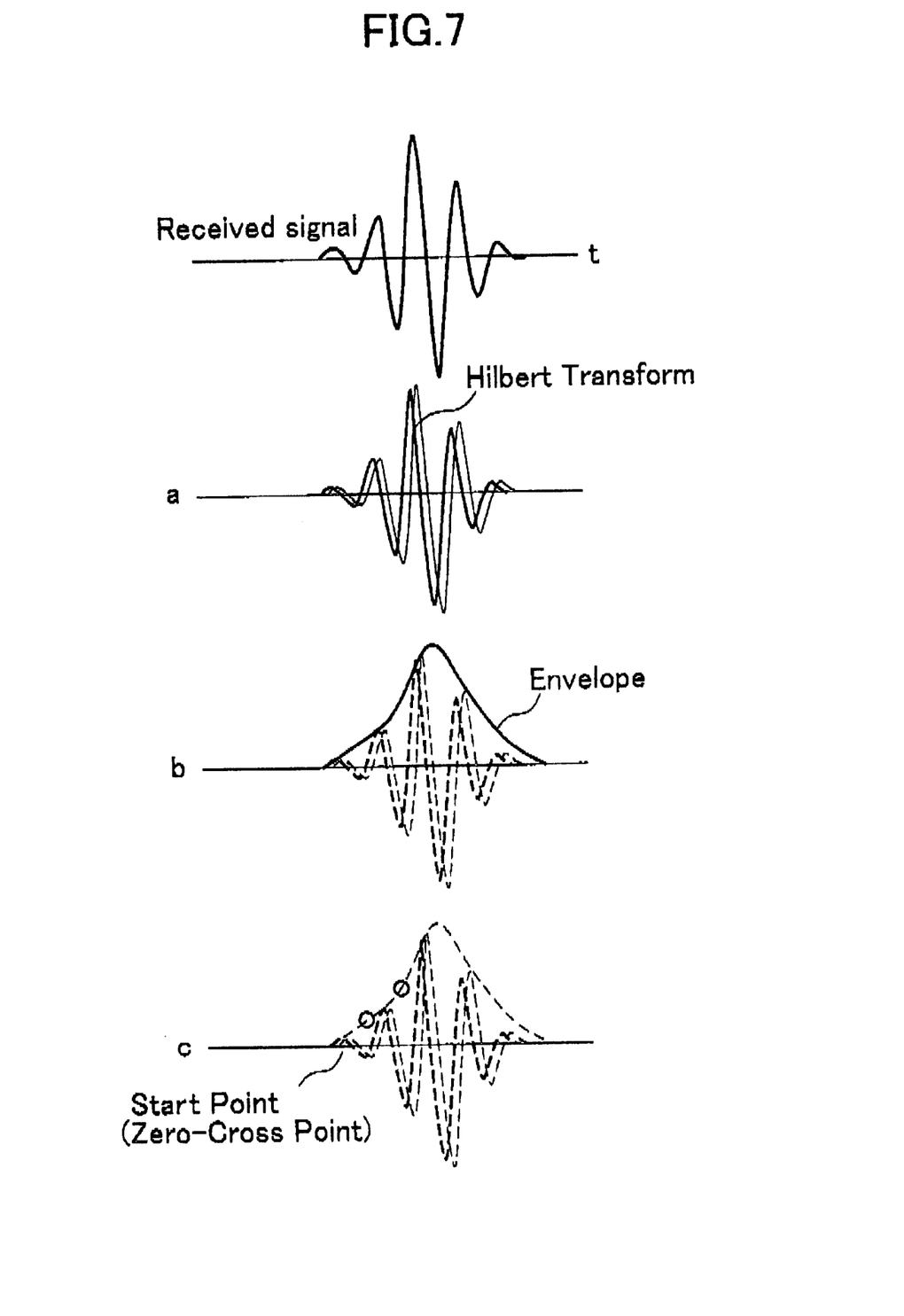
FIG. 7 is a simplified graphical representation of an algorithm for calculating the arrival time of an ultrasonic receive signal according to the present invention, wherein a correlation factor which is the result of correlation processing proves to be multiple-peaked.

The system for detecting multiple-peaked signals is based on the principle that an envelope is determined by means of Hilbert transform, and then a time difference in the arrival of receive signals is determined from the envelope. The maximum value decision means used here is the same as the one shown in FIG. 2. In this mode, however, the maximum value decision means will provide many solutions if the signal is multiple-peaked. In order to identify a correct solution, another means is used and thereby an approximate time difference in the arrival of ultrasonic receive signals is determined in such a way an described in the following paragraphs. The algorithm for calculating the arrival time of these receive signals is shown in FIG. 7. The method of identification is described hereafter with reference to FIGS. 6 and 7.

Firstly, upstream and downstream ultrasonic receive signals are changed into discrete values with A/D converters (steps S51 and S52). From the values, a cross-correlation between the upstream and downstream ultrasonic receive signals is determined by correlation processing means (step S53). The correlation factor thus determined is Hilbert-transformed to obtain the result of Hilbert transform calculation (step S54). Then, a phase relationship is calculated by phase calculating means using the correlation factor and the result of Hilbert transform calculation (step S55).

Next, the upstream and downstream ultrasonic receive signals are digitized (A/D-converted), as shown in FIG. 6, by the additional means incorporated in the flowmeter configuration of FIG. 2. From the discrete values thus obtained, a Hilbert transform in determined (step S57). Then, from the receive signals and the result of Hilbert transform, an envelope is calculated. The envelope in given by equation 8 below, where the ultrasonic receive signal is S and the Hilbert transform thereof is H.

$$\sqrt{S^2+H^2} \qquad \text{Equation 8}$$

Figure 8:
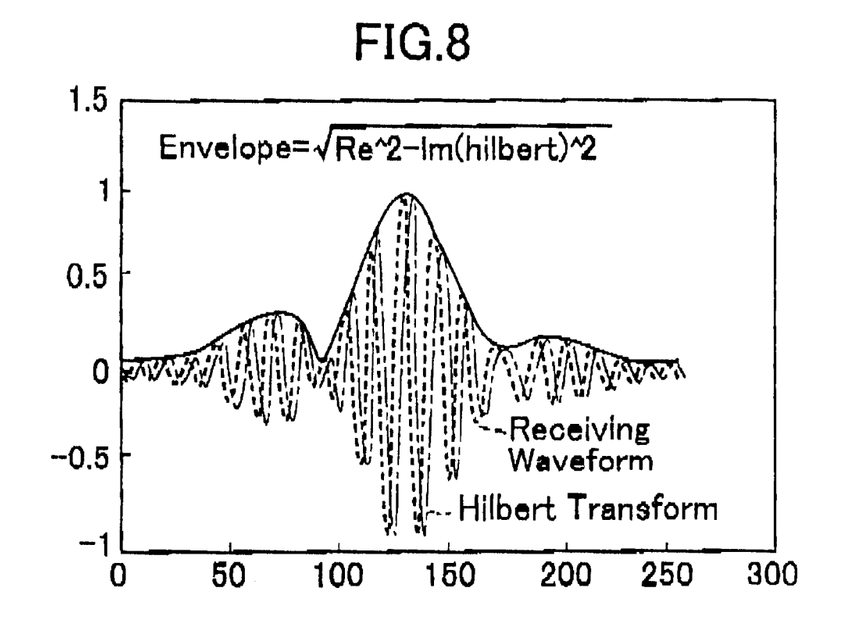
FIG. 8 is a waveform chart obtained by graphing an envelope actually calculated according to an ultrasonic receive signal.

FIG. 8 shows the result of actual calculation based on a given ultrasonic receive signal. The figure indicates that an envelope is calculated correctly according to equation 8. Zero-cross points are determined from the slopes of the envelope by interpolation and thereby the arrival time of the signal is determined. This process is carried out by time measurement means (second calculating means) for both upstream and downstream receive signals. A difference in the arrival time is used as an approximate time difference (step S58). On the other hand, the maximum value decision means shown in FIG. 2 is used for time difference options that provide plural maximum values. With the maximum value decision means, the true maximum value (time difference) in determined from the result of phase calculation and the result of calculation made by the time measurement means (step S56).

In this mode, it is possible to use the Hilbert transform algorithm of the basic flowmeter configuration as is. Another advantage of this process is that the algorithm is less likely to produce a large error due to such accidental noise as might be generated when straightforwardly determining threshold levels for a signal. This in because the algorithm determines an envelope by extrapolation and evaluates the signal using zero-cross points.

Yet another advantage in that the process only requires such a degree of time resolution as to enable any given peak to be discriminated from an adjacent peak or peaks. As discussed in the principle of cross-correlation, the cross-correlation function shares the same frequency, i.e., f0=1 to a few megahertz, with the transmitting device. This means a time resolution of 0.1 to 1 $\mu$sec will suffice for one period of a signal. This value is readily attainable since a time difference caused by flow velocity is, however small it may be, in the order of several tow or hundred picoseconds.

Another point to note about this mode is that it is possible to make shared use of only one Hilbert transform unit, instead of using two separately. One specific configuration example is shown in FIG. 12. In this configuration, the single Hilbert transform unit may first be used to transform a receive signal during correlation processing. Then, upon completion of the correlation processing, the unit may be used once again by means of a switching signal in order to perform another Hilbert transform for correlation processing.

Yet another point to note is that, in FIGS. 7 and 8, the method of determining the arrival time of a signal from the result of envelope calculation is by no means limitative. In an earlier discussion regarding FIG. 7, however, it is stated that the arrival time of a signal is determined simply by extrapolating an envelope. It should be noted here that the ultimate goal meant by this statement is to determine an approximate time difference. Thus, there may be such an alternative method that curvilinear approximation in the second or so order in carried out using several plots of data. Yet another alternative method with regards to FIG. 9 may be performing interpolation with a second-order curve and determining a differential coefficient, or finding an average using several plots of data that exceed a given threshold.

Figure 9:
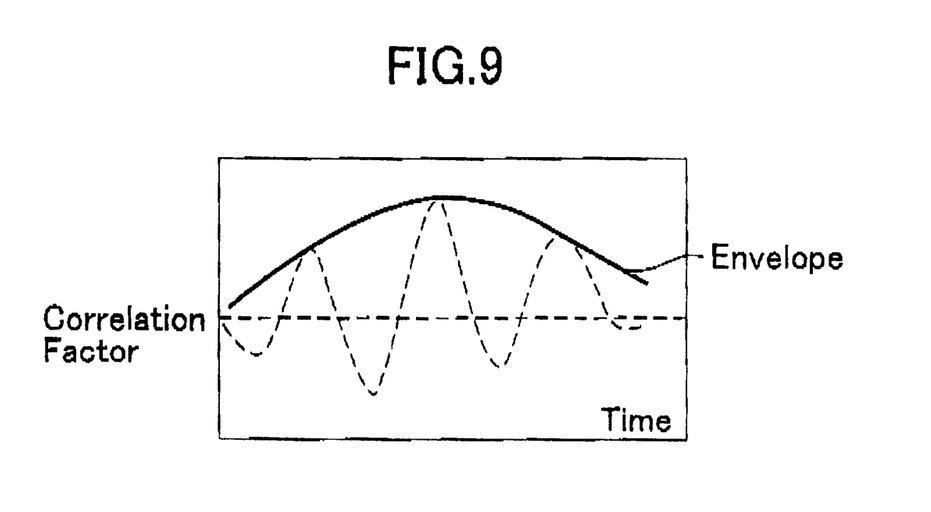
FIG. 9 Is a waveform chart obtained by graphing an envelope determined by finding the geometric mean of the results of calculating a cross-correlation between upstream and downstream receive signals and Hilbert transforming the cross-correlation.

The following system is available as another multiple-peaked signal detection system (system for discriminating among multiple peaks of a signal) in this mode of carrying out the present invention. That is, the geometric mean of the results of calculating a cross-correlation between two signals and Hilbert-transforming the result of correlation calculation is determined. These two values are those of sine and cosine functions, as indicated by equations 3 and 4. Finding the geometric mean thereof, therefore, results in the calculation of an envelope. Consequently, a value equivalent to an amplitude is determined, as shown in FIG. 9.

This means, the time determined to be concurrent with the maximum value of the amplitude corresponds to an approximate time difference (third calculating means). Then, from the approximate time difference thus determined and the result of calculation made by the phase calculating means, the maximum value of a correlation factor is evaluated. More specifically, the method of determining the approximate time difference discussed here and a method of determining a precise time difference given by equation 7 may be combined so that a correct and precise time difference is evaluated from the result of correlation processing of a multiple-peaked signal.

Figure 10:
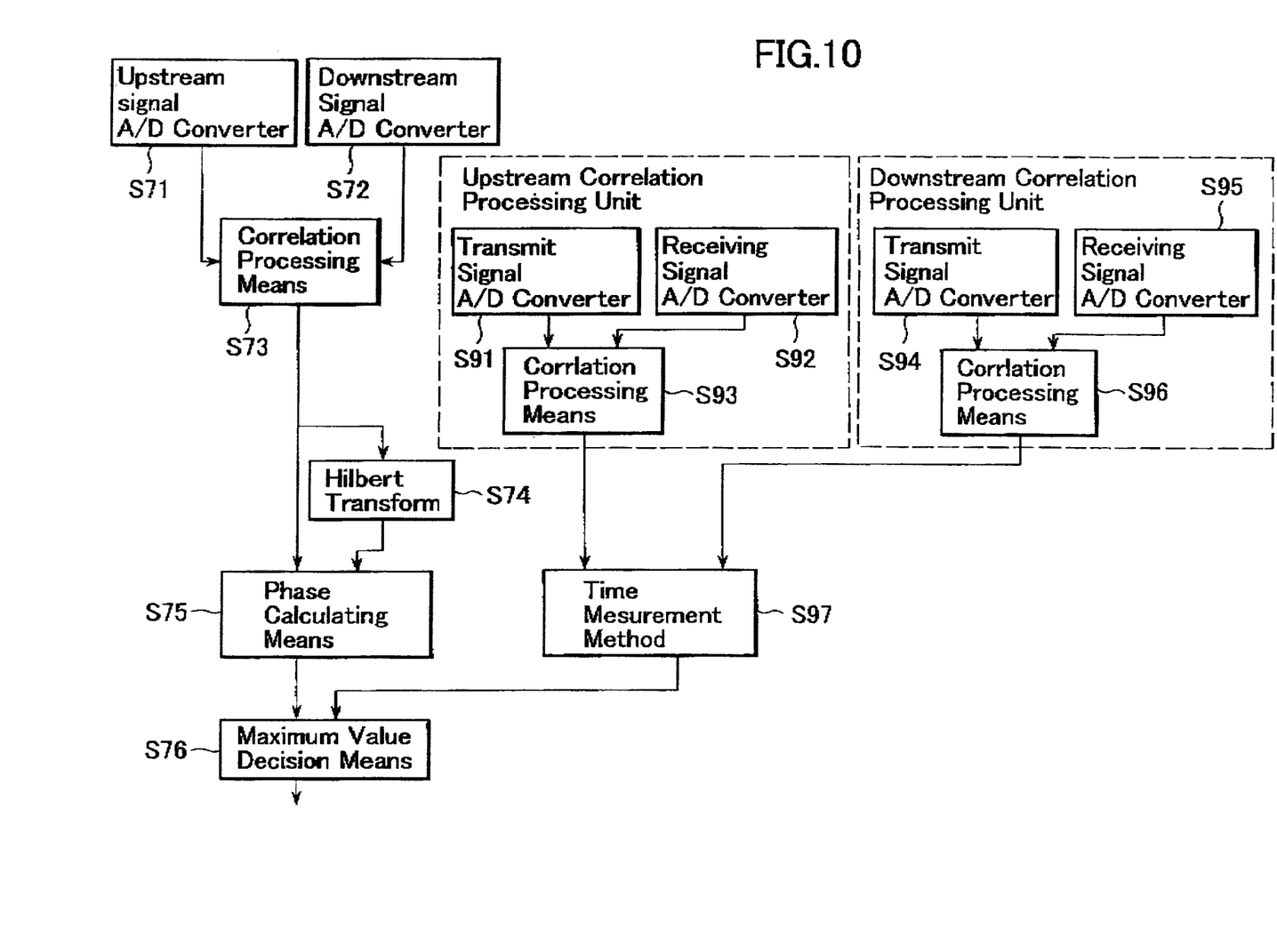
FIG. 10 is a flow charts representing a system for processing ultrasonic signals according to the present invention, wherein a correlation factor which is the result of correlation processing proves to be multiple-peaked.
Figure 11:
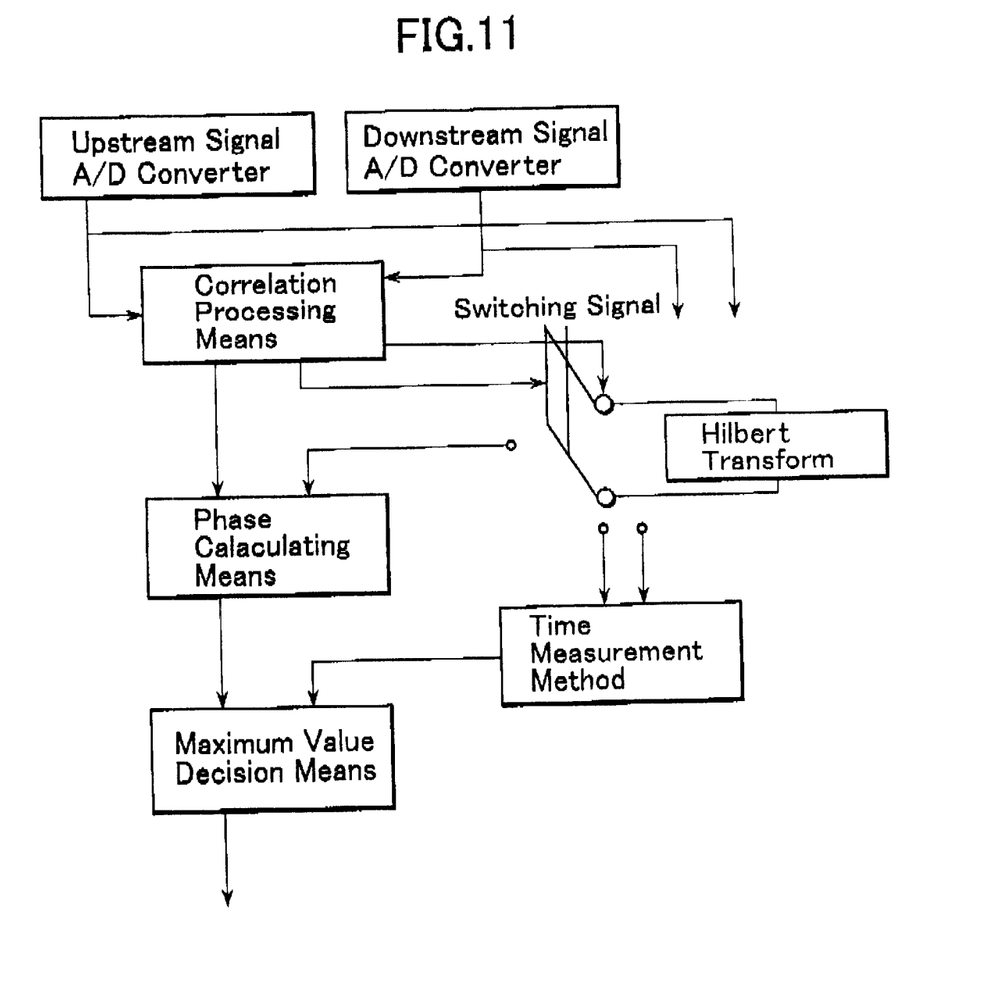
FIG. 11 in a flow chart representing a case where the two Hilbert transform units in the system of FIG. 6 are reduced to one.

The system discussed below is available as yet another multiple-peaked signal detection system (system for discriminating among multiple peaks of a signal). FIG. 10 shows the flow chart of signal processing performed by the multiple-peaked signal detection system. The system employs the conventional method wherein an auto-correlation is used in order to determine an approximate time difference. In the multiple-peaked signal detection system, the approximate time difference is determined by finding upstream and downstream time differences from auto-correlations between transmit and receive signals. The system itself carries out the same process as that performed by correlation processing means used by regular ultrasonic flowmeters.

Specifically, upstream and downstream ultrasonic receive signals are changed into discrete values with A/D converters, an shown in FIG. 10 (steps S71 and S72). From the discrete values, a cross-correlation between the upstream and downstream receive signals is determined by correlation processing means (step S73). The correlation factor thus determined is then Hilbert-transformed to obtain the result of Hilbert-transformation calculation (step S74). A phase relationship is determined by phase calculating means using the correlation factor and the result of Hilbert transform (step S75).

In a further step, correlation processing is carried out in an upstream correlation processing unit 40. Accordingly, upstream and downstream ultrasonic receive signals are changed into discrete values with A/D converters (steps S91 and S92). From the discrete values, an auto-correlation between the upstream transmit and receive signals is determined by correlation processing means (step S93). Also in a downstream correlation processing unit 50, upstream and downstream ultrasonic receive signals are changed into discrete values with A/D converters (steps S94 and S95). Thus, an auto-correlation is determined by phase correlation processing means (step S96).

In a still further step, an approximate time difference is determined by time difference calculating means (fourth calculating means) using the auto-correlations determined by the correlation processing means as described above (step S97). From the correlation factor determined by correlation processing means (step S3), the result of phase calculation made by phase calculating means using the result of Hilbert transform calculation provided by Hilbert transform (step S75), and the result of time difference calculation made by the time difference calculating means (step S97), a precise time difference, i.e., the maximum value of the correlation factor, is determined by the maximum value decision means (step S76).

Some algorithmic contrivance may be included in the above-noted units for auto-correlation processing. For example, the units may be designed not to use waveforms or calculation results that are obviously abnormal, including cases when an evaluated time value or correlation factor value is too small.

In another aspect of the present invention, algorithmic contrivance may also be included in many other parts of the flowmeter configuration. For example, the flowmeter configuration may be designed not to use data values, which have deviated greatly from those of an expected waveform or correlation factor due to accidental noise, in any further processing step.

In yet another aspect of the present invention, a cross-correlation between receive signals is mentioned as an example. It is also possible, however, to use an auto-correlation between a transmit (modulating) signal and a receive signal. This approach will make it possible to determine a precise time value from the auto-correlation by means of interpolation using Hilbert transformation. The speed of sound can also be evaluated by precisely measuring the propagation time of the signal.

According to a first aspect of the present invention recited in claim 1, it is possible to attain such a time resolution an to ensure high processing accuracy, by using a relatively simple flowmeter configuration. This can be implemented without having to make complex higher-order curvilinear interpolation calculations, while at the same time retaining the inherent feature of a correlation method that the method is highly immune to accidental changes in a signal due to disturbance.

According to second to fourth aspects of the present invention recited in claims 2 to 4, it is possible to identify a true time difference in a case where a given correlation factor proven to be multiple-peaked.

What is claimed is:

1. An ultrasonic flowmeter for determining a flow rate according to ultrasonic signals passing through a fluid, comprising:
   calculating means for A/D-converting and thereby discretizing an upstream receive signal and a downstream receive signal;
   correlation processing means for determining a cross-correlation between said upstream receive signal and said downstream receive signal;
   calculating meant for Hilbert-transforming the result of correlation processing provided by said correlation processing means;
   phase calculating means for determining a phase relationship from the results of calculation provided by said correlation processing means and said Hilbert transform means; and
   first calculating means for calculating a time difference from the result of phase relationship calculation provided by said phase calculating means.

2. An ultrasonic flowmeter for determining a flow rate according to ultrasonic signals passing through a fluid, comprising:
   calculating means for A/D-converting and thereby discretizing an upstream receive signal and a downstream receive signal;
   correlation processing means for determining a cross-correlation between said upstream receive signal and said downstream receive signal;
   calculating means for Hilbert-transforming the result of correlation processing provided by said correlation processing means;
   phase calculating means for determining a phase relationship from the results of calculation provided by said correlation processing means and said Hilbert transform means;
   first calculating means for determining a time difference from the result of phase relationship calculation provided by said phase calculating means;
   calculating means for Hilbert-transforming said upstream receive signal and said downstream receive signal;
   calculating means for determining an envelope from said upstream receive signal, said downstream receive signal and the result of calculation provided by said Hilbert transform means;
   second calculating means for determining a time difference from said envelope; and
   a function for determining a flow velocity dependent time difference from time differences determined by said second calculating means and said first calculating means.

3. An ultrasonic flowmeter for determining a flow rate according to ultrasonic signals passing through a fluid, comprising:
   calculating means for A/D-converting and thereby discretizing an upstream receive signal and a downstream receive signal;
   correlation processing means for determining a cross-correlation between said upstream receive signal and said downstream receive signal;
   calculating means for Hilbert-transforming the result of calculation provided by said correlation processing means;
   phase calculating means for determining a phase relationship from the results of calculation provided by said correlation processing means and said Hilbert transform means;
   first calculating means for determining a time difference from the result of phase relationship calculation provided by said phase calculating means;
   third calculating means for determining an envelope from the geometric mean of the results of calculation provided by said correlation processing means and said Hilbert transform means, and then calculating a time difference from the maximum value of said envelope; and
   a function for determining a flow velocity dependent time difference from time differences determined by said third calculating means and said first calculating means.

4. An ultrasonic flowmeter for determining a flow rate according to ultrasonic signals passing through a fluid, comprising:

- calculating means for A/D-converting and thereby discretizing an upstream receive signal and a downstream receive signal;
- correlation processing means for determining a cross-correlation between said upstream receive signal and said downstream receive signal;
- calculating means for Hilbert-transforming the result of calculation provided by said correlation processing means;
- phase calculating means for determining a phase relationship from the results of calculation provided by said correlation processing means and said Hilbert transform means;
- first calculating means for determining a time difference from the result of phase relationship calculation provided by said phase calculating means;
- fourth calculating means for determining auto-correlations between upstream ultrasonic transmit and receive signals and between downstream ultrasonic transmit and receive signals, respectively, and thereby calculating a time difference; and
- a function for determining a flow velocity dependent time difference from time differences determined by said fourth calculating means and said first calculating means.

* * * * *